United States Patent [19]

Todero

[11] 4,420,885
[45] Dec. 20, 1983

[54] POWER TOOL WITH IMPROVED BRAKING DEVICE

[75] Inventor: Giuseppe Todero, Mandello del Lario, Italy

[73] Assignee: Black & Decker Inc., Newark, Del.

[21] Appl. No.: 368,514

[22] Filed: Apr. 15, 1982

[30] Foreign Application Priority Data

Apr. 17, 1981 [IT] Italy ............... 21266 A/81

[51] Int. Cl.³ ............................................. B27B 17/02
[52] U.S. Cl. .................................. 30/381; 188/77 R
[58] Field of Search ................. 30/381, 382, 383, 384; 188/77 R

[56] References Cited

U.S. PATENT DOCUMENTS

| | | | |
|---|---|---|---|
| 3,485,326 | 10/1967 | Wilkin | 30/382 |
| 3,485,327 | 10/1967 | Gudmunsen | 30/382 |
| 3,785,465 | 1/1974 | Johansson | 30/383 X |
| 3,934,345 | 1/1976 | Hirschkoff | 30/381 |
| 3,937,306 | 2/1976 | Naslund et al. | 30/383 |
| 3,964,333 | 6/1976 | Hirschkoff | 30/381 |
| 3,974,566 | 8/1976 | Pilatowicz | 30/382 |
| 4,059,895 | 11/1977 | Hirschkoff | 30/382 |
| 4,091,896 | 5/1978 | Wieland | 188/77 R |
| 4,121,339 | 10/1978 | Nikolich | 30/381 |
| 4,152,833 | 5/1979 | Phillips | 30/382 |
| 4,197,640 | 4/1980 | Murray | 30/382 |
| 4,324,045 | 4/1982 | Hoppner | 30/381 |

FOREIGN PATENT DOCUMENT

2632304  2/1977  Fed. Rep. of Germany .

*Primary Examiner*—Jimmy C. Peters
*Attorney, Agent, or Firm*—Harold Weinstein; Edward D. Murphy

[57] ABSTRACT

A portable power tool includes a manually actuable safety lever and an inertial safety system for activating a brake of the tool to provide a more effective safety arrangement. A first spring applies the brake when the safety lever contacts the hand, wrist or arm of an operator during "kick-back" or like violent movement of the tool. A second spring is operable independently of the safety lever for also releasing the first spring. An inertia mass is displaceable effectively independently of the safety lever when the brake is in the inoperative condition. This inertia mass releases the second spring, so releasing the first spring and applying the brake, upon occurrence of "kick-back" or the like. Preferably, the second spring operates a hammer release mechanism for striking a locking lever releasably retaining the safety lever. A band brake of a chain saw or circular saw may particularly be operated in this manner.

22 Claims, 8 Drawing Figures

POWER TOOL WITH IMPROVED BRAKING DEVICE

FIELD OF THE INVENTION

This invention relates to an improved braking device for power tools and is primarily intended to be incorporated in portable chain saws or portable circular saws which may be driven by electric motors or internal combustion engines and comprising drive means for the tool, brake means operable on means transmitting power from the drive means to the tool, first energy storage means for applying said brake means, and safety lever means operable to release said first energy storage means and apply said brake means when said safety lever contacts the hand, wrist or arm of an operator during "kick-back" or like violent movement.

BACKGROUND OF THE INVENTION

It is known that certain power tools such as portable chain saws or circular saws may sometimes undergo violent or sudden sharp movements or "kick-back" during use which may cause serious injury to the operator or damage to the device if the cutting members of the power tool are not stopped rapidly.

There exist many safety devices having a brake employing a brake band actuated by a return-spring-loaded safety bar or lever wherein the safety lever is maintained in the spring-loaded condition by a pawl. The pawl is intended to release the lever as soon as said lever executes a rotary movement caused by impact of the hand or wrist or arm of the operator holding the saw. The result of this impact is that the spring transmits a rotary movement to the lever which thus actuates the brake and arrests the movement of the saw chain. Devices of this type are, for example, described in U.S. Pat. Nos. 4,059,895; 3,964,333; 4,121,339 and 3,776,331 and in German Offenlegungsschrift Nos. 2922573/4 and 2632304. These devices require that the safety lever be positively rotated in order to disengage the locking pawl and thus actuated the brake. In the event that the operator improperly holds the chain saw, it is possible with a kick-back movement that the safety lever will not impact the hand or arm of the operator to be positively rotated thereby and the chain saw will continue to operate with possible resultant injuries to the operator.

U.S. Pat. No. 4,121,339 and German Offenlegungsschrift No. 2922573 and U.S. Pat. No. 3,923,170 indicate that the guard member forming the safety lever may itself also form an inertia mass during kick-back to actuate the brake by virtue of the inertia of said guard member being equivalent or proximating to the manual force required to activate the brake when such guard lever strikes against the arm or wrist of the operator. German Offenlegungsschrift No. 2621818 discloses a guide bar for the chain which is pivotable in the casing so as to displace a lever which in turn trips a safety lever which is also arranged to contact the hand or wrist of an operator during kick-back to activate the brake. In this device the same or a similar force is required to trip the safety device and effect locking as the manual action and this is substantial. This force together with the speed of reaction and power involved therein is not considered adequate for desired safety. German Offenlegungsschrift No. 2632304 also discloses an arrangement wherein a manually actuable safety lever is operable to disengage a clutch. It is desirable to have a safety device with sufficient sensitivity of operation which has a guard member having the dual function of being operable by striking against the hand or wrist of the operator and also whose own mass may provide sufficient inertia during a kick-back to activate the brake whilst also permitting normal daily use wherein the guard member may come into contact with objects during handling without unnecessarily activating the brake. To overcome this disadvantage, braking devices have been proposed which act immediately as a consequence of a sharp movement of the portable saw when the chain saw moves sharply in the direction of the operator's body and also when the safety lever does not receive an impact from the hand of the operator.

For example, a somewhat complicated and less efficient arrangement is disclosed in U.S. Pat. No. 3,785,465 wherein a safety lever is provided to impact the hand of the operator to cause, by electro-mechanical means, a locking arm to disengage the drive to a centrifugal clutch and to apply a brake to the clutch drum. An electrically operated, acceleration sensitive transmitter is also referred to as being arranged in the chain guide bar to energise and electro-magnet when the guide bar is subjected to kick-back and to similarly stop the chain by applying the brake. No details of the nature of the transmitter are given and it is considered such device, apart from being complicated to manufacture, would not produce the desired sensitivity, reliability and speed of reaction of the safety means, nor could such device be produced in economic manner.

U.S. Pat. No. 3,937,306 discloses a chain saw having a safety lever with spring means actuable to tighten a band brake to stop the chain upon contact with the operator's arm or wrist and further discloses a resiliently mounted carrying handle or front stirrup adjacent said safety lever and having a projection which with sufficient kick-back action also acts to operate the safety lever. This arrangement is not considered readily practical since it is difficult to provide the desired resilience of mounting of the front stirrup which permits such to be used as a supporting handle in daily use and which also may be resiliently deflected to activate the brake in desired manner. Further, it would appear resilient displacement of the supporting handle or stirrup to the brake activating position may well be dependent upon the operator's manual pressure on said supporting handle in addition to any inertial forces which presupposes the operator has maintained his grip on the device with kick-backk which is not necessarily the situation and which does not ensure adequate safety.

U.S. Pat. Nos. 3,485,326 and 3,485,327 disclose a chain arresting element slidable on an inclined surface upon a kick-back occuring so as to engage with the chain or with a drive drum and whereon said displaceable members are retained until subject to a kick-back force by magnetic means or by a spring bias. U.S. Pat. No. 3,485,327 also discloses a spring biased pawl engageable in cogs on a drum secured to the drive shaft to thereby arrest the chain movement. It is not considered in certain circumstances that these devices will be adequate as regards the speed of operation and effectiveness of stopping and, furthermore, these devices do not also include a safety lever operable by striking against the hand or wrist of the operator. U.S. Pat. No. 3,397,795 J. L. Dooley discloses an arrangement having a manually operated safety lever which is operable to disengage a clutch and thus remove driving torque from the cutting chain. In addition to this safety feature, the guide rail or bar around which the cutting chain is rotated is mounted so as to be displaceable by way of its inertia upon being subject to kick-back action so as to disengage clutch means and thereby remove the driving torque from said cutting chain.

U.S. Pat. No. 3,974,566 discusses various considerations involved in achieving desired safety control and makes mention of the various prior arrangements. U.S. Pat. No. 3,974,566 does not disclose a safety lever acting to apply a brake to the chain upon contact with the hand or wrist of an operator during kick-back, but rather achieves a braking effect by way of an inertia mechanism independent of operator-manipulation and operable in response to adverse conditions, such as chain saw kick-back, to trigger the release of stored energy developed by operation of said chain saw. This is done for the purpose of releasing a spring, thus actuating a safety brake mechanism; the brake applying means comprising said spring is retained in the inoperative position by pressurized gas within a chamber, which gas is supplied thereto by conduit means from the interior of the crank case of the internal combustion engine.

Referring now to U.S. Pat. No. 3,974,566, this arrangement of inertia responsive means (59), including a rotor means (60) and having an eccentric weight (62) operable to cause the rotor (60) to undergo rotary movement relative to a vent (55) of the pressure chamber (49) in response to a kick-back, and thus the inertia of the rotor (60) including eccentric weight (62) will open vent means (53) and depressurize the chamber (49) to permit the spring (34) to activate the brake.

These prior devices utilizing an inertia system are too complicated and therefore do not result in economic manufacture and, furthermore, do not operate within the required time limits for safety, or the sensitivity thereof is not sufficient. In many of the devices, the force required to be exerted by the component acting as the inertia mass to activate the brake means is too great to permit rapid actuation thereof upon occurrence of a kick-back with desired sensitivity and within the desired time limits.

SUMMARY OF THE INVENTION

It has been found that in the design of a brake mechanism for a chain saw the stopping time for the chain should not exceed a predetermined time from the time the operator contacts the safety lever in a kick-back situation to the time the chain stops. However, if the chain is stopped too quickly this can result in excessive stresses. It has been found preferable to provide a brake mechanism which will stop the chain quickly from commencement of the kick-back action, and provision of an inertial system with such capability is an object of the invention. Also, when determining the minimum and maximum force to be applied to a safety lever, the minimum force should be such as to avoid accidental braking during normal use, and the maximum force should avoid breaking the operator's wrist. Further, the distance between the handle and safety lever should preferably be small to ensure timely operation of the brake, and the safety lever should not be displaced too far since it must also serve as a protective guard.

It is another object of the present invention to provide a power tool having a safety device including a manually actuable safety lever operable by first energy storage means wherein an inertial system is also provided effectively operating independently of any inertial action of the safety lever and operating with requisite speed and sensitivity.

A feature by which this is achieved is the provision of a second energy storage means releasable by an inertia mass effectively independent of the manually actuable safety lever when in the energized position and prior to actuation, the second energy storage means releasing the first energy storage means and applying the brake mechanism upon occurrence of a kick-back or like violent movement.

This has the advantage that should the safety lever fail to contact the operator and effect braking of the tool, the safety lever will still be released by the second energy storage means and braking effected. Also, as both systems for applying the brake are independently actuable, either can apply the brake first, depending upon the circumstances.

Accordingly, therefore the present invention provides a portable power tool, especially a circular saw or chain saw, comprising a braking device actuated by a safety lever loaded by a first spring forming first energy storage means and maintained in the spring-loaded condition by disengageable retaining means, and a striker or hammer release means spring-loaded in a "cocked" position by a second spring forming second energy storage means and released by movement of a displaceable inertia mass to cause the striker or hammer release means to act positively on the disengageable retaining means so as to release the spring-loaded safety lever in the event of a kick-back or like violent action.

The second energy storage means and/or the inertia mass may be located on the main chassis of the power tool or completely or partly on the safety lever. The safety lever is preferably hollow or box-like and in such situation at least the inertia mass is preferably located within the safety lever so as to be protected thereby and provide a space saving arrangement.

The structural and functional characteristics of the invention and its advantages over the known art will become even more evident from the exemplifying description that follows with reference to the accompanying diagrammatic drawings.

DETAILED DESCRIPTION OF THE PREFERRED EMBODIMENTS

Figures 1, 3:
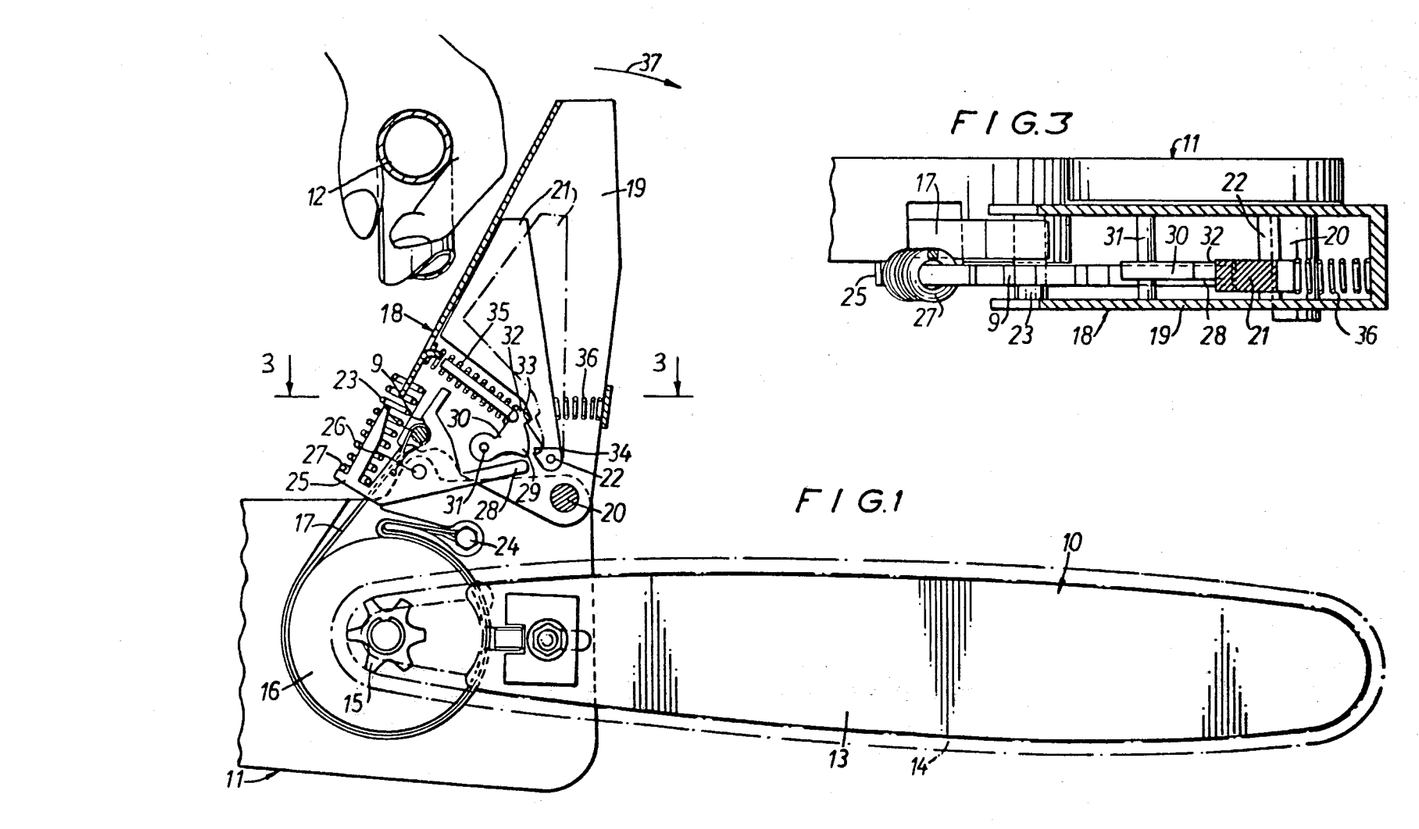
FIGS. 1 and 2 are two sectional views through part of a chain saw illustrating the manner of operation of the safety device according to the invention.
FIG. 3 is an enlarged section in the direction of the line 3—3 of FIG 1.
Figure 2:
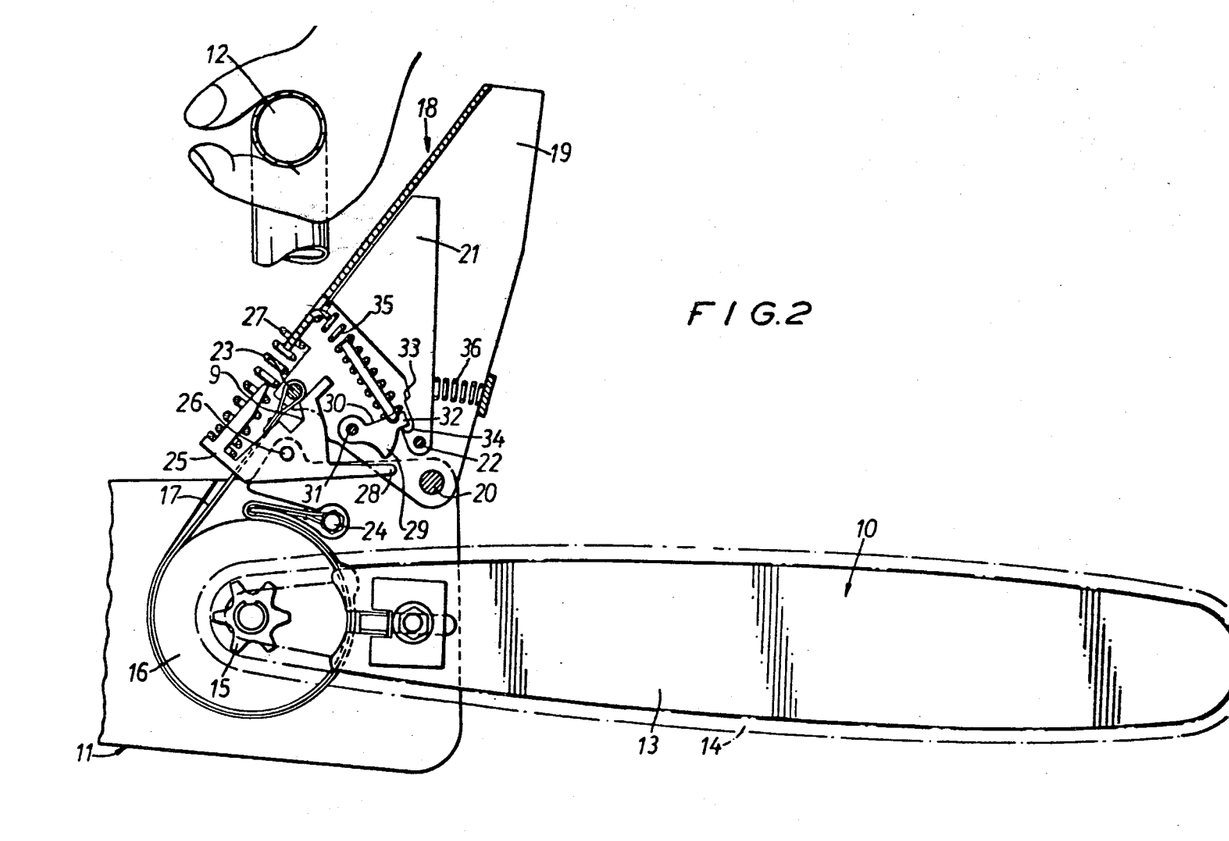
Figure 4:
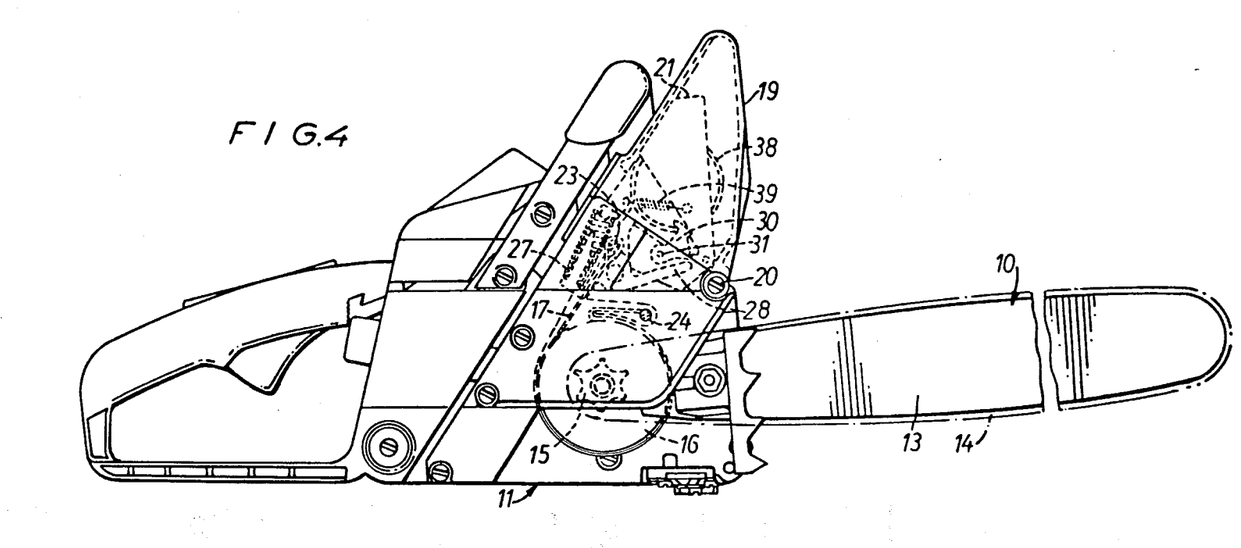
FIG. 4 is a sectional view of a chain saw equipped with an alternative embodiment of the inertial system according to the invention.

With reference to FIGS. 1 to 3 of the drawings, in a portable chain saw a blade 10 extends in projecting manner from a body 11 provided with an upper grip 12 and a rear grip (not shown). As is known, the blade 10 comprises a bar 13 on which a saw chain 14 is caused to rotate by a motordriven sprocket 15. To the shaft of the sprocket 15 there is keyed a brake drum 16 on which acts a brake including a brake band 17 controlled by a safety device. This kind of portable chain saw structure and manually operable brake means is in itself known, and is, for example, similar to that described in the U.S. Pat. No. 4,059,895.

The safety device for controlling the intervention of the brake means utilizing brake band 17 is the subject of the present invention.

The safety device is indicated generally by the reference number 18, and comprises a safety lever 19 pivoted at 20 to the body 11, and a flat inertial mass 21 pivoted at 22 in the interior of the box-shaped structure of the lever 19.

An end of the brake band 17 is secured to a pin 23 of the lever 19, the other end of which is secured at 24 on the body 11. The pin 23 is also engageable with a notch 9 of a locking lever 25 pivoted at 26 to the body 11. Between said levers 19 and 25 there also acts a spring 27 forming a first energy storage means and for the loading of the safety device.

A tail 28 extends from the lever 25 and cooperates with a trigger 29 forming part of a pawl 30 pivoted in this example to the interior of the box-shaped lever 19 at 31. The pawl 30 forms a hammer release means and is provided with a tooth portion 32 which is engageable in a notch 33 of the inertial mass 21 in the cocked position of the device, and is stopped by a further notch 34 in the inertial mass 21. The pawl 30 is loaded by means of a compression spring 35 which forms a second energy storage means and acts between it and the safety lever 19, and is maintained in spring-loaded condition by engagement of the tooth portion 32 with the notch 33 of the inertial mass 21. The inertial mass 21 is biased towards the trigger 29 by a spring 36 to ensure engagement with the pawl 30 in the cocked position, and such spring 36 may be mounted (not shown) adjustable in force if it is desired to adjust the automatic tripping point.

It is not essential to the invention that the pawl 30 and inertial mass 21 be mounted on the lever 19. These components could for example be mounted on the body 11 of the chain saw.

The operation of the safety device described above is briefly as follows: when, for any reason giving rise to a sharp movement or kick-back of the chain saw towards the operator, the hand of the operator on the grip 12 is impacted by the safety lever 19, the lever 19 is caused to rotate about pivot 20, in the clockwise direction indicated by the arrow 37, thus causing the pin 23 to disengage from the notch 9 of the lever 25. Consequently, the spring 27 instantaneously rotates the safety lever 19 into the position of FIG. 2, so as to draw the brake band 17 on the drum 16 and cause the chain to stop.

Also, however, when the chain saw undergoes a so-called "kick-back" action relative movement takes place between the safety lever 19 and the inertial mass 21, which tends to remain in its original position as shown by the dotted and dashed line in FIG. 1. Consequently, the pawl 30 disengages from the notch 33 and is instantaneously rotated by the compression spring 35 clockwise and strikes the tail 28 prior to being subsequently stopped from moving beyond its useful motion by engaging in the notch 34. Thus the trigger 29 of the pawl 30 acts as a hammer, and by striking on the tail 28, also causes the lever 25 to rotate (from the position of FIG. 1 to the position of FIG. 2), thus releasing the pin 23 from the notch 9 and causing the actuation of the brake in the same manner as described hitherto.

The re-loading of the safety device takes place by simple manual rotation of the safety lever 19 in an anticlockwise direction. This causes the tooth 32 to latch onto the notch 33, as a result of the anticlockwise rotation of the lever 25, thrust by the spring 27, and of the consequent action of its tail 28 on the trigger 29.

The safety device according to the invention has shown itself to be of highly dependable operation because of the presence of the inertia mass which is independent of the safety lever 19 and which, by means of the unlatching of the pawl 30, releases the entire force of the compression spring 35 so as to cause the safety lever 19 actuating the brake to act positively and instantaneously.

Another and not negligible advantage of the device in question is its compactness resulting from the box-shaped structure of the safety lever 19 containing and protecting all the mechanisms, to which ready access can be had.

A modified arrangement is disclosed in FIGS. 4 to 7 wherein like or similar parts bear the same reference numerals as in FIGS. 1 to 3. The main difference in this arrangement comprises replacement of the previous compression spring 35 with a torsional spring 38 which is in tension when loaded and acts against the pawl 30 biasing such towards tail portion 28. The weaker acting previous compression spring 36 is replaced by an expansion spring 39 which is a very light spring required to bias the inertia mass 21 in the anti-clockwise direction, as viewed, for recocking the device. The torsional spring 38 has one end portion engaged on the safety lever 19 and its other end 40 extends out of the plane of the spring and acts against a shoulder 41 on the pawl 30. The expansion spring 39 has a hooked portion at one end engaging in an aperture 42 in inertia mass 21, and a hooked portion 43 at its other end engaging with a detent 44 on the lever 19.

Figure 5:
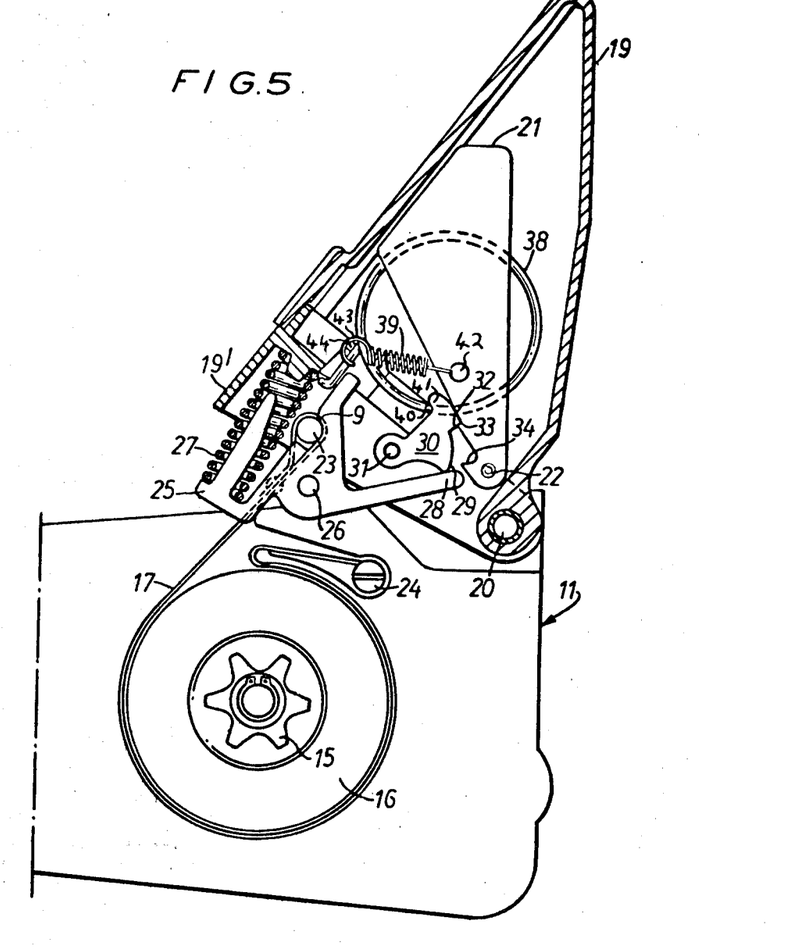
FIG. 5 is an enlarged fragmentary detail illustrating the alternative embodiment of the inertial system in the "cocked" position.
Figure 6:
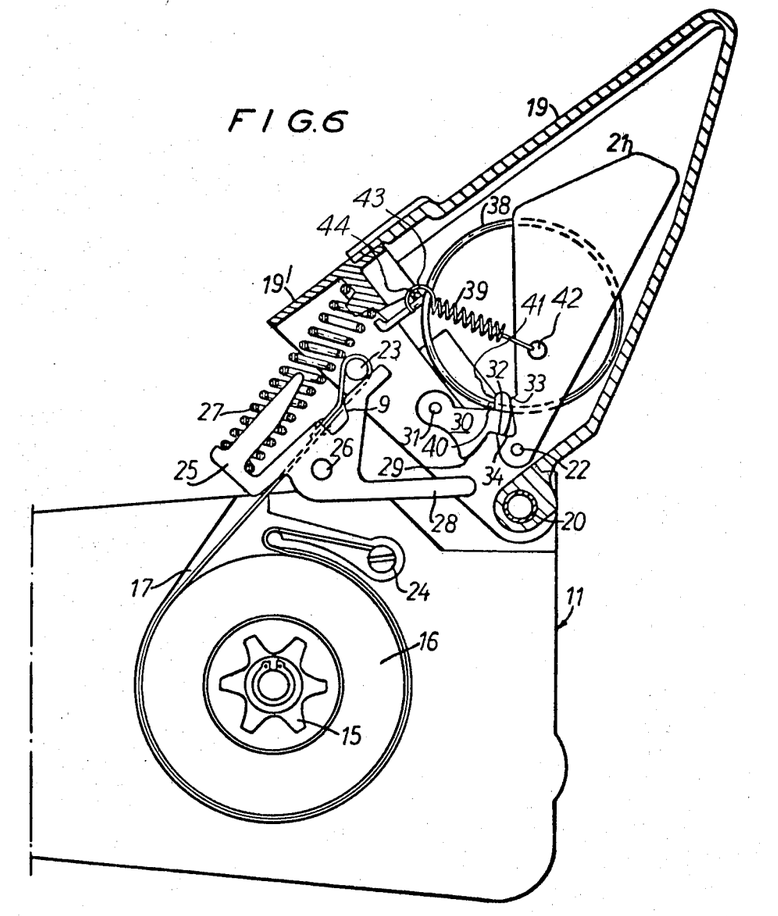
FIG. 6 is a view of the arrangement of FIG. 5 in the "released" position.
Figure 7:
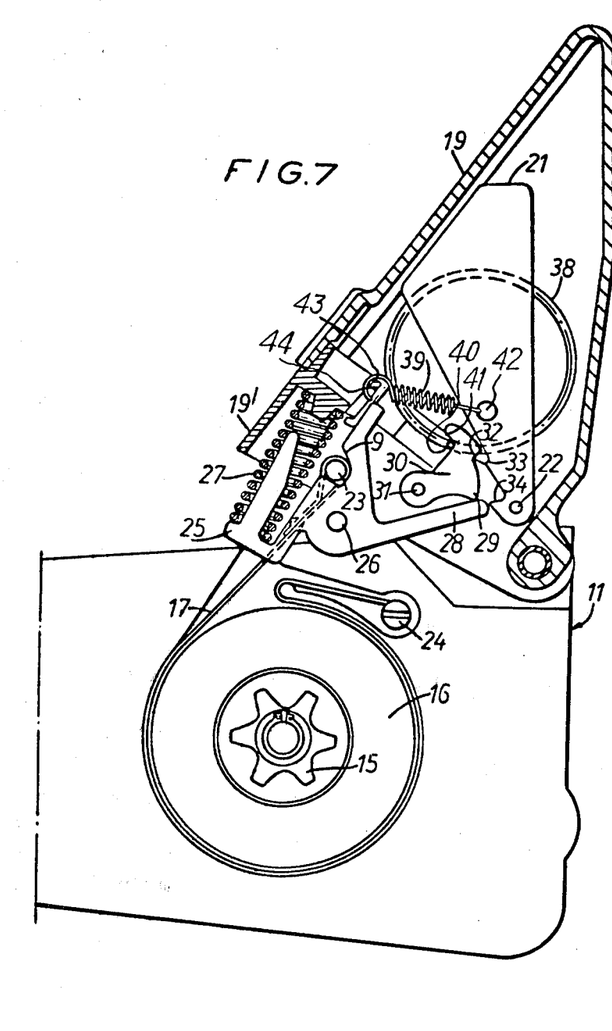
FIG. 7 is a view similar to FIGS. 5 and 6 of the safety devices being "recocked" i.e. being returned to the position of FIG. 5.

In FIG. 5 the "cocked" position of the safety device is shown whilst in FIG. 6 the released position is shown wherein the device after having undergone kick-back action has, by the unlatching operation of the inertia mass 21 and the subsequent hammer-like striking of the pawl 30 against the tail 28 to release pin 23, moved in the clockwise direction to the position wherein the brake band 17 grips the brake drum 16. In FIG. 7, the safety device is shown during the recocking movement wherein the safety lever 19 (with mechanism support part 19') is moved anti-clockwise from the position of FIG. 5 to compress load springs 27 and 38, and prior to a slight relaxation whereupon the tooth portion 32 abuts against the notch 33 brought into position under the action of the return spring 39.

Figure 8:
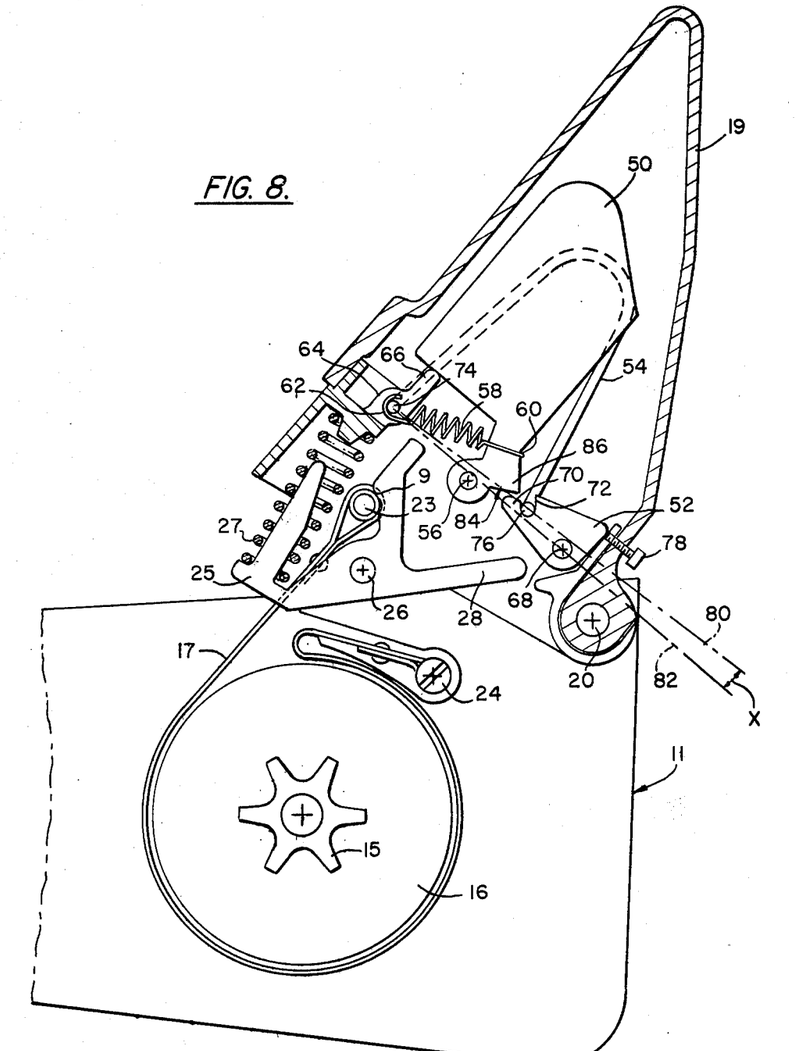
FIG. 8 is a fragmentary detail illustrating a third embodiment of the inertial system according to the invention.

Another and preferred modified arrangement is disclosed in FIG. 8, which is a similar view to FIG. 5, and like or similar parts in FIG. 8 bear the same reference numerals as in FIG. 5. The safety lever 19, the locking lever 25, the notch 9 and pin 23, and the compression spring 27 all function as previously described. The main differences in this embodiment comprise the arrangement, loading and operation of the inertia mass 50, the pawl 52, and the second energy storage means which is in the form of a hairpin spring 54.

The inertia mass 50 is pivoted to the safety lever at 56 and is biased into the "cocked" position shown by a light tension spring 58. One end 60 of the tension spring 58 engages around the inertia mass and the other end 62 engages a bracket 64 on the safety lever 19. The bracket 64 has an upstanding stop part 66 into arresting engagement with which the inertia mass 50 is resiliently drawn by the spring 58. The pawl 52 is pivoted at 68 to the safety lever at a location adjacent the pivot 20 thereof. The pawl 52 is formed with a trigger 70 and a notch 72. The hair spring 54 has its ends bent at right angles to the plane of FIG. 8, one 74 of the ends being located in a bore in the bracket 64, and the other end 76 being located in the notch 72 of the pawl 52. In the "cocked" position shown the hair spring 54 is under compression urging the pawl clockwise against an adjustable screw stop 78. This is due to an over-center latching angle between the pivoted end 74 of the hairpin spring, the pivot 68 of the pawl 52, and the position of the hair spring end 76 in the notch 72. This over-center angle x is shown between the broken lines 80, 82 drawn respectively through the end 76 and the pivot 68 and passing through the pivoted end 74 of the hairpin spring. It should be noted that in this position there is a small clearance 84 between the pawl 52 and an adjacent toothed portion 86 of the inertia mass 50; the significance of this will be described later.

In operation, when "kick-back" occurs, assuming the safety lever has not been manually actuated, the inertia mass 50 pivots clockwise relative to the safety lever 19 causing the toothed portion 86 to engage the trigger end 35 of the pawl 52 and rotate it anti-clockwise. The instant the end 76 of the hair spring passes over the center line 82, the hair spring is released and fires the trigger 70 downwardly to hammer against the tail 28 of the locking lever 25, so disengaging the latter from the pin 23 and releasing the first storage energy means spring 27 to apply the brake 17, 16.

The spring-loaded over-center hammer release means formed by the hairpin spring 54 and the pawl 52 has very little friction restricting its movement, and the triggering force necessary to move it over the center line 82 is predetermined by the angle machined into the parts and can be adjusted by the screw stop 78.

The clearance 84 between the inertia mass 50 and the pawl 52 is a feature of this preferred embodiment. This allows the inertia mass 50 to "bounce" somewhat during normal vibrations, cutting, and handling, etc. under the restraining influence of the light spring 58; but when kick-back of sufficient energy occurs, the inertia mass 50 hits the pawl 52 with sufficient force to move it anti-clockwise over the center line 82 so tripping the hammer release mechanism 52, 54. With this arrangement, it will be appreciated that the inertia mass 50 can move a predetermined amount without releasing the second energy storage means 54. The advantages of this are two-fold; it allows for tolerance variations in the involved parts, and it accommodates bumps of the power tool into the work and driving motor vibration which might release other types of mechanisms.

It will be appreciated that the inertial system of the present invention is in the cocked position effectively separate from the manual safety lever in the cocked position, and can be shaped and dimensioned to provide optimum inertial system characteristics while at the same time permitting a manually operable safety lever system having optimum operating characteristics of its own. The system is reliable and economic to manufacture and enables improved standards of safety to be achieved in simple manner.

The above described embodiments, of course, are not to be construed as limiting the breadth of the present invention. Modifications, and other alternative constructions, will be apparent which are within the spirit and scope of the invention as defined in the appended claims.

For instance, apart from mounting the pawl 30 and inertia mass 21 elsewhere than on the safety lever 19, for example, on the main body 11, or the alternative formation of this latch and trigger arrangement, the inertia part of the device may be combined with any other type of manually actuable safety lever device or even be used on its own.

What is claimed is:

1. A portable power tool, comprising:

means for driving the tool;

means for transmitting power from said driving means to the tool;

means, operable on said transmitting means from an inoperative condition to an operative condition, for braking the tool;

first energy storage means for applying said brake means;

safety lever means, operable to release said first energy storage means, for applying said brake means when said safety lever means contacts an operator's hand, wrist or arm during kick-back or like violent movement of the tool;

second energy storage means, operable independently of said safety lever means, for releasing said first energy storage means; and an inertia mass displaceable effectively independently of said safety lever means when said brake means is in the inoperative condition, said inertia mass releasing said second energy storage means which in turn releases said first energy storage means to apply said brake means, upon occurrence of kick-back or like violent movement of the tool.

2. The power tool claimed in claim 1, wherein said inertia mass is pivotally mounted on said safety lever.

3. The power tool claimed in claim 1, wherein said second energy storage means comprises a spring-loaded pawl pivotally mounted on said safety lever and provided with a tooth portion engageable with a notch on said inertia mass, said mass being biased into the engaged position with said tooth portion by a spring acting between said mass and said safety lever.

4. The power tool claimed in claim 3, comprising a pivoted locking lever releasably engageable with said safety lever means to normally retain the latter in the spring-loaded position, and wherein said first energy storage means comprises a spring compressed between said safety lever and said locking lever.

5. A portable power tool, comprising:

a braking device having a brake band;

a spring-loaded safety lever connected to said braking device and operable when released to apply said brake band to brake the tool;

means for normally retaining said safety lever in the spring-loaded condition but being disengageable to release said spring-loaded safety lever;

a spring-loaded hammer release mechanism associated with said disengageable retaining means;

a displaceable inertia mass normally retaining said hammer release mechanism in the spring-loaded condition; and said hammer release mechanism being released by relative displacement of said inertia mass to act positively on said disengageable retaining means to disengage the latter and release said spring-loaded safety lever to brake the tool in the event of kick-back or like violent action during operation of the tool.

6. The power tool claimed in claim 5, wherein said safety lever is box-like and houses said hammer release mechanism, said inertia mass and, at least in part, said disengageable retaining means.

7. The power tool claimed in claim 5, wherein said hammer release mechanism acts on a tail portion of said retaining means.

8. The power tool claimed in claim 5, wherein said disengageable retaining means comprises a locking lever pivoted to a body part of the power tool and provided with a notch which is engaged by a pin of said safety lever.

9. The power tool claimed in claim 5, wherein said second energy storage means is a torsion spring.

10. A portable power tool, comprising:
a body;
a motor supported by the body;
means for transmitting power from the motor to drive the tool;
a brake operative on said transmitting means for braking the tool;
a spring-loaded safety lever, pivotally mounted on said body, for applying said brake;
means for normally retaining said safety lever in the spring-loaded condition but being disengageable to release said spring-loaded safety lever, with consequential application of said brake, upon contact of said lever against an operator's hand, wrist or arm upon kick-back or like violent movement during operation of the tool;
a releasable spring-loaded pawl associated with said retaining means; and
a pivoted inertia mass normally retaining said pawl in the spring-loaded condition, said mass being relatively displaced during kick-back or like violent movement of the tool to release said spring-loaded pawl causing the latter to strike and release said retaining means and so release said spring-loaded safety lever if said lever has not already been released by contact with the operator.

11. The portable power tool claimed in claim 10, wherein said inertia mass is spring biased towards said pawl causing said mass to engage said pawl during movement of said safety lever to spring load the latter.

12. The portable power tool claimed in claim 10, wherein said retaining means comprises a locking lever pivoted to said body and having a notch releasably engaging a projection on said safety lever.

13. The portable power tool claimed in claim 12, wherein said locking lever is pivoted intermediate its length, and has a part containing said notch, and another part disposed adjacent said spring-loaded pawl to be struck thereby upon release thereof to disengage said notch from said projection.

14. The portable power tool claimed in claim 13, wherein said safety lever is spring loaded by a spring compressed between said safety lever and said locking lever.

15. The portable power tool claimed in claim 14, wherein said inertia mass and said spring-loaded pawl are both pivotally mounted on said safety lever.

16. The portable power tool claimed in claim 10, wherein said tool is a chain saw.

17. A portable power tool, comprising:
means for driving the tool;
means for transmitting power from said driving means to the tool;
means, operable on said transmitting means from an inoperative condition to an operative condition, for braking the tool;
first energy storage means for applying said brake means;
safety lever means, operable to release said first energy storage means, for applying said brake means when said safety lever means contacts an operator's hand, wrist or arm during kick-back or like violent movement of the tool;
second energy storage means, operable independently of said safety lever means, for releasing said first energy storage means; an inertia mass displaceable relative to said safety lever means, said inertia mass being so displaced to release said second energy storage means which in turn releases said first energy storage means to apply said brake means upon occurrence of kick-back or like violent movement of the tool if said brake means has not already been applied by operation of said safety lever means;
resilient means for biasing said inertia mass relative to said safety lever means in a direction away from releasing said second energy storage means; and
said inertia mass being displaceable relative to said safety lever means a predetermined amount under the restraining influence of said resilient means without releasing said energy storage means.

18. The power tool claimed in claim 17, wherein said second energy storage means comprises a spring-loaded over-center hammer release mechanism.

19. The power tool claimed in claim 18, wherein said spring-loaded over-center hammer release mechanism comprises a pawl pivotally mounted on said safety lever means, and a spring urging said pawl into an inoperative position when said hammer release mechanism is cocked but effecting a hammer action of said pawl to release said first energy storage means when said inertia mass is relatively displaced more than said predetermined amount.

20. The power tool claimed in claim 19, wherein said resilient means comprises another spring connected between said inertia mass and said safety lever means, and said safety lever means has a stop portion against which said inertia mass is biased by said another spring to create a small clearance between said inertia mass and said pawl.

21. The power tool claimed in claim 20, wherein said first energy storage means includes a pivoted locking lever arranged to releaseably latch said safety lever means in the cocked position, said locking lever having a portion which is struck by said pawl during the hammering action thereof to release said releaseable latch.

22. The power tool claimed in claim 21, wherein said spring of said over-center hammer release mechanism is a hairpin spring having one end connected to said safety lever means and the other end connected to said pawl.

* * * * *